(12) United States Patent  
Hutchins

(10) Patent No.: US 8,988,441 B2  
(45) Date of Patent: Mar. 24, 2015

(54) RECONFIGURABLE 3D GRAPHICS PROCESSOR

(76) Inventor: Edward A. Hutchins, Mountain View, CA (US)

( * ) Notice: Subject to any disclaimer, the term of this patent is extended or adjusted under 35 U.S.C. 154(b) by 396 days.

(21) Appl. No.: 13/370,184

(22) Filed: Feb. 9, 2012

(65) Prior Publication Data

US 2012/0206447 A1     Aug. 16, 2012

Related U.S. Application Data

(60) Provisional application No. 61/462,985, filed on Feb. 10, 2011.

(51) Int. Cl.
    *G06T 1/20*           (2006.01)
    *G06T 15/00*         (2011.01)

(52) U.S. Cl.
    CPC .................................. *G06T 15/005* (2013.01)
    USPC ......................................................... 345/506

(58) Field of Classification Search
    CPC ......... G06T 17/00; G06T 1/20; G06T 15/005; G06T 15/00
    USPC .......................................................... 345/506
    See application file for complete search history.

(56) References Cited

U.S. PATENT DOCUMENTS

| | | | |
|---|---|---|---|
| 6,424,345 B1 * | 7/2002 | Smith et al. | 345/423 |
| 6,975,318 B2 * | 12/2005 | Junkins et al. | 345/423 |
| 2006/0148527 A1 * | 7/2006 | Blount | 455/566 |

* cited by examiner

*Primary Examiner* — Hau Nguyen  
(74) *Attorney, Agent, or Firm* — Cool Patent, P.C.

(57) ABSTRACT

Briefly, in accordance with one or more embodiments, a reconfigurable 3D graphics processor includes a pipeline configuration manager, a rasterizer, and a memory coupled to the triangle rasterizer. The pipeline configuration manager is capable of configuring the graphics processor to operate in a direct rasterizing mode or a tiling mode to process a sequence of drawing commands received from a processing unit.

20 Claims, 17 Drawing Sheets

RECONFIGURABLE 3D GRAPHICS PROCESSOR

CROSS-REFERENCE TO RELATED APPLICATIONS

The present application claims the benefit of U.S. Provisional Application No. 61/462,985 filed Feb. 10, 2011 by inventor Edward A. Hutchins. Said Application No. 61/462,985 is hereby incorporated herein by reference in its entirety.

BACKGROUND

The rendering of three-dimensional (3D) graphical images, known as 3D rendering, is of interest in a variety of electronic games and other applications. Rendering is the general term that describes the overall multi-step process of generating a two-dimensional (2D) raster image of an object or scene described with vertex coordinate positions and topological connectivity information.

The 3D rendering process typically involves a number of operations, for example transforming object vertex positions from one coordinate space to another, projecting vertex positions onto two-dimensional polygons suitable for representation on a two-dimensional raster display or image, removing objects not visible within a projected two-dimensional area or facing away from the viewpoint, clipping the polygons against a view volume, scan converting and/or rasterizing the polygons to a set of discreet pixel sample positions, and shading and/or lighting the individual pixels using information interpolated from the values of attributes such as color associated with object vertex positions. In order to display an animation to the user, an application may render changing viewpoints or frames in rapid sequence, displaying each frame momentarily while rendering the subsequent frame.

Graphics Processing Units (GPUs) are specialized integrated circuit devices that are commonly used in graphics systems to accelerate the performance of a three-dimensional rendering application. GPUs are commonly used in conjunction with a Central Processing Unit (CPU) to generate three-dimensional images for one or more applications executing on a computer system. Modern GPUs typically utilize a pipeline of rendering operations executing in parallel for processing data associated with the 3D rendering process.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
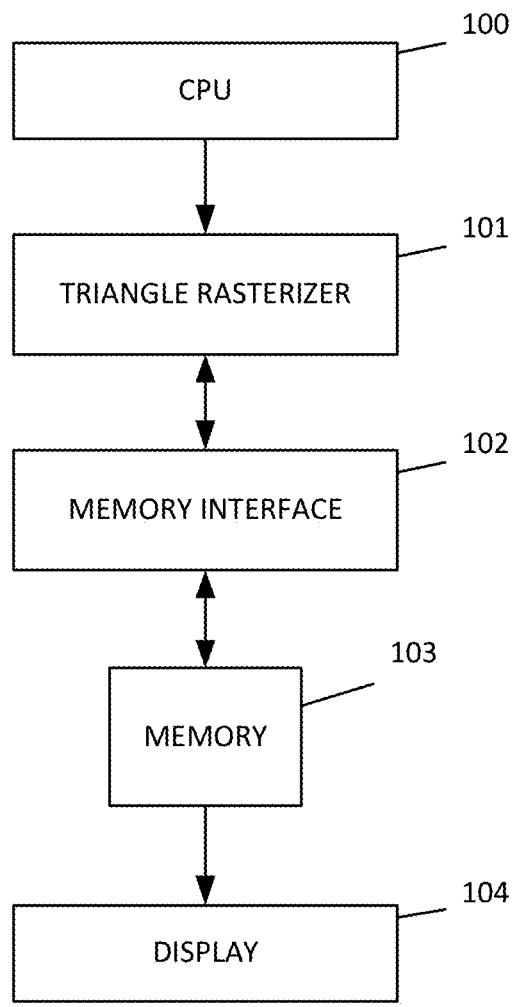
FIG. 1 is a diagram of a conventional 3D graphics processing pipeline in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1, a diagram of an overall 3D graphics processing pipeline in accordance with one or more embodiments will be discussed. One example of such a typical graphics processing unit (GPU) is depicted in FIG. 1. At a high level of abstraction, the GPU comprises a CPU 100 running one or more applications that generate sequences of drawing commands. A sequence of drawing commands may comprise descriptions of geometric shapes, typically triangles, points and lines, vertex coordinates and other per-vertex attributes such as color or lighting information, and any mode settings used to control how the drawing commands are to be processed by the GPU. A triangle rasterizer 101 processes the commands and determines which pixels are covered by each drawn object in the sequence each object was submitted to the rasterizer 101 by the CPU 100. Each drawn object may be rendered in its entirety before subsequent objects are processed. For each pixel on the interior of each object, the memory interface 102 is utilized to send requests to memory 103 for reading and writing the pixels as well as fetching any ancillary information such as, for example, prior pixel values or texture image data. Once an image has been rendered, it is typically sent to a display interface 104, although rendered images may be used elsewhere in the computer application or system, and the scope of the claimed subject matter is not limited in this respect. As discussed in further detail, herein, the GPU of FIG. 1 may be configured to process 3D graphics.

Figure 2:
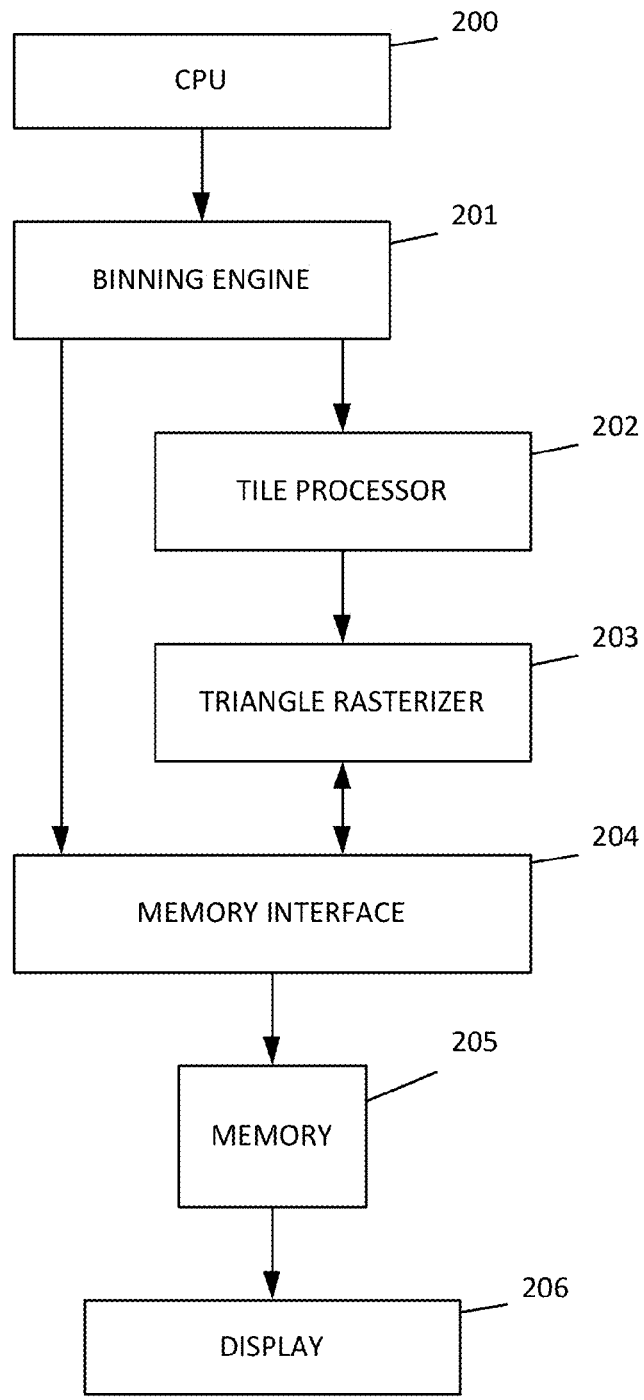
FIG. 2 is a diagram of a tiling-based 3D graphics processing pipeline in accordance with one or more embodiments.

Referring now to FIG. 2, a diagram of a tiling-based 3D graphics processing pipeline in accordance with one or more embodiments will be discussed. A tiling-based GPU is depicted in FIG. 2. At a high level of abstraction, such a tiling-based GPU comprises a CPU 200 running one or more applications that generate sequences of drawing commands. A binning engine 201 determines which rectangular regions or tiles of the image being rendered are covered by each drawn object and sorts the command stream into data structures associated with each screen tile. The purpose of this sort phase is to gather only commands relevant to a particular tile in one group in order to facilitate quicker rendering during the pixel processing portion of the GPU's operation.

An example tile organization might be a regular grid of tiles 16 by 16 pixels in size completely covering the image to be rendered. In other embodiments any tiling, whether regular or following some other scheme for partitioning the frame to be rendered, is also possible. For each tile covered by a given object, the binning engine 201 utilizes the memory interface 204 to append the drawing commands for the object in a data structure associated with each tile stored in memory 205. Once all drawing commands for the image to be rendered have been processed by binning engine 201, the tile processor 202 processes the command data structure associated with each tile in sequence, issuing commands which have been determined to affect the currently processed tile to the triangle rasterizer 203. The triangle rasterizer 203 processes the commands and determines which pixels are covered by each drawn object. For each pixel on the interior of each object, the memory interface 204 is utilized to send requests to memory 205 for reading and writing the pixels as well as fetching any ancillary information such as, for example, prior pixel values or texture image data. Once an image has been rendered it is typically sent to a display interface 206, though rendered images may be used elsewhere in the computer application or system, and the scope of the claimed subject matter is not limited in this respect.

The tiling-based GPU as shown in FIG. 2 is capable of gaining performance relative to the GPU shown in FIG. 1 under some circumstances due to its ability to have storage for intermediate tile pixel processing buffers in dedicated memories. In addition, confining pixel processing to regions of the frame to be rendered can increase the locality of accesses to other buffers, for example during texturing operations. The tiling-based GPU may suffer a corresponding penalty for additional storage required during the binning phase of operation. This penalty may be incurred when writing binned commands to main memory and reading commands back during tile pixel processing. Different embodiments of a tiling-based GPU may make different trade-offs in deciding whether to replicate commands while writing binned commands, read multiple times from shared command streams during the tile pixel processing phase, or some combination of these trade-offs. In either case, the tiling-based GPU handles cases where the input command stream exceeds any available local buffering and must be spilled to memory 205.

While binning buffers must be able to spill to memory, tile pixel buffers may be dedicated rather than potentially stored in memory due to the smaller, fixed size of a tile relative to the whole image being rendered. In cases where extensive pixel processing is being performed, such dedicated storage is capable of yielding increased performance and/or reduced power consumption, or both. However, as the number and complexity of geometric commands being processed increases, the additional memory storage and bandwidth required by the binning engine 201 and tile processor 202 may eliminate any pixel processing efficiencies that the tiling-based GPU offers.

An example to illustrate such a potential knee in the performance of tiling-based versus conventional GPUs is as follows. Assume each vertex to be rendered consists of 16 bytes of attribute information, and each triangle requires two vertexes of data, wherein the third vertex comes from a prior triangle in the sequence due to triangle clustering performed by the application. Further assume each pixel in the image consists of 8 bytes of information. Even if every triangle is written to and read from only one bin, the cost of (read+write) *16 bytes*2 vertexes per triangle is 64 bytes. If the triangles contain fewer than 8 pixels each, the net cost of storing and reading the triangle description outweighs any possible gain from keeping pixel accesses local to a pixel tile buffer because this extra cost is not present in a conventional rasterizer. In general, a tiling-based GPU is generally not considered superior to a conventional GPU in every possible or useful case due to trade-offs such as have been illustrated.

Figure 3:
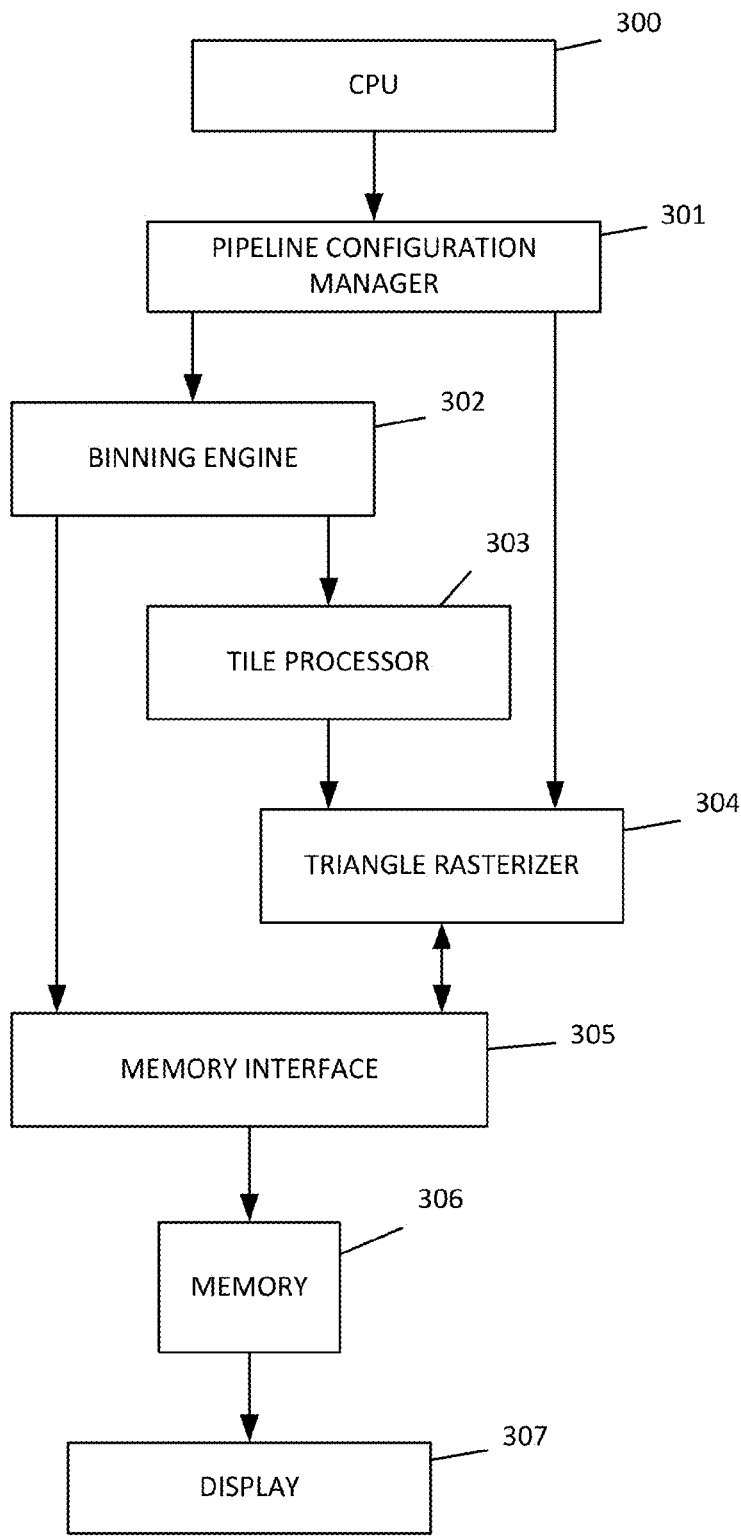
FIG. 3 is a diagram of a reconfigurable 3D graphics processing pipeline in accordance with one or more embodiments.

Referring now to FIG. 3, a diagram of a reconfigurable 3D graphics processing pipeline in accordance with one or more embodiments will be discussed. In the example shown in FIG. 3, the configurable choice is between two GPU operating modes: a conventional GPU mode as shown in FIG. 1 or a tiling-based GPU mode as shown in FIG. 2. The reconfigurable 3D graphics processing pipeline as shown in FIG. 3 is capable of optimizing external memory bandwidth and vertex and pixel processing costs by using the more optimal mode based on extrapolation of the performance of the prior frame of the current operational mode and the estimated performance of the complementary unused mode. In other embodiments, two or more other operating modes may be utilized instead of the selecting between tiling-based and conventional GPU modes, and/or any other known technique of measuring or estimating which mode would be optimal likewise may be utilized.

In operation, the CPU 300 executes one or more applications which generate sequences of drawing commands. A pipeline configuration manager 301 determines which mode of operation is to be used for the processing of each frame of drawing commands, configuring the processing units accordingly. In this example, the configuration choice may be determined at least in part by the currently executing application, or it may be determined dynamically by estimating the cost of each mode of operation. The configuration manager 301 may operate as a simple programmatic selection switch controlled by application or driver software, may automatically select new operational modes at frame boundaries, or may embody both automatic and programmatic operation modes. In other embodiments, any suitable metric or cost estimator may be employed to determine the desired operating mode. In this example, the pipeline may have two modes of operation: either as a conventional GPU or as a tiling-based GPU. Other embodiments may combine any desired set of operating modes. The pipeline configuration manager 301 can either direct incoming graphical drawing commands to a binning engine 302 when operating in tiling mode, or it can direct commands to the triangle rasterizer 304 when operating in conventional mode.

When operating in conventional mode, the pipeline configuration manager 301 bypasses the binning engine 302 and passes drawing commands directly to a triangle rasterizer 304 which processes said commands and determines which pixels are covered by each drawn object in the sequence each object was submitted to the rasterizer by the CPU 300. Each drawn object is rendered in its entirety before subsequent objects are processed. For each pixel on the interior of each object, the memory interface 305 is utilized to send requests to memory 306 for reading and writing the pixels as well as fetching any ancillary information such as, for example, prior pixel values or texture image data.

When operating in tiling mode, the binning engine 302 determines which rectangular regions or tiles of the image being rendered are covered by each drawn object. An example tile organization might be, for example, a regular grid of tiles 16 by 16 pixels in size completely covering the image to be rendered. Other embodiments might use a different tile size, for example 32 by 32 pixels in size, or any other method for partitioning the frame into separate regions for later tile pixel processing.

For each tile covered by a given object, the binning engine 302 utilizes the memory interface 305 to append the drawing commands for the object in a data structure associated with each tile stored in memory 306. Once all drawing commands for the image to be rendered have been processed by binning engine 302, the tile processor 303 processes the command data structure associated with each tile in sequence, issuing commands which have been determined to affect the currently processed tile to the triangle rasterizer 304. The triangle rasterizer 304 processes the commands and determines which pixels are covered by each drawn object. For each pixel on the interior of each object, the memory interface 305 is utilized to send requests to memory 306 for reading and writing the pixels as well as fetching any ancillary information such as, for example, prior pixel values or texture image data.

In order to facilitate both modes of operation, in this example embodiment the triangle rasterizer 304 can access both dedicated tile memories and/or buffers located in memory 306. In addition, any intermediate computations related to rasterization should be of sufficient precision to be valid for both the tile size and full image resolutions. In alternate embodiments, this may be accomplished by utilizing two different triangle rasterizers 304, one dedicated to tile processing and one dedicated to full image resolution conventional rendering. Once an image has been rendered it is typically sent to a display interface 307, though rendered images may be used elsewhere in the computer application or system, and the scope of the claimed subject matter is not limited in this respect.

Figure 4:
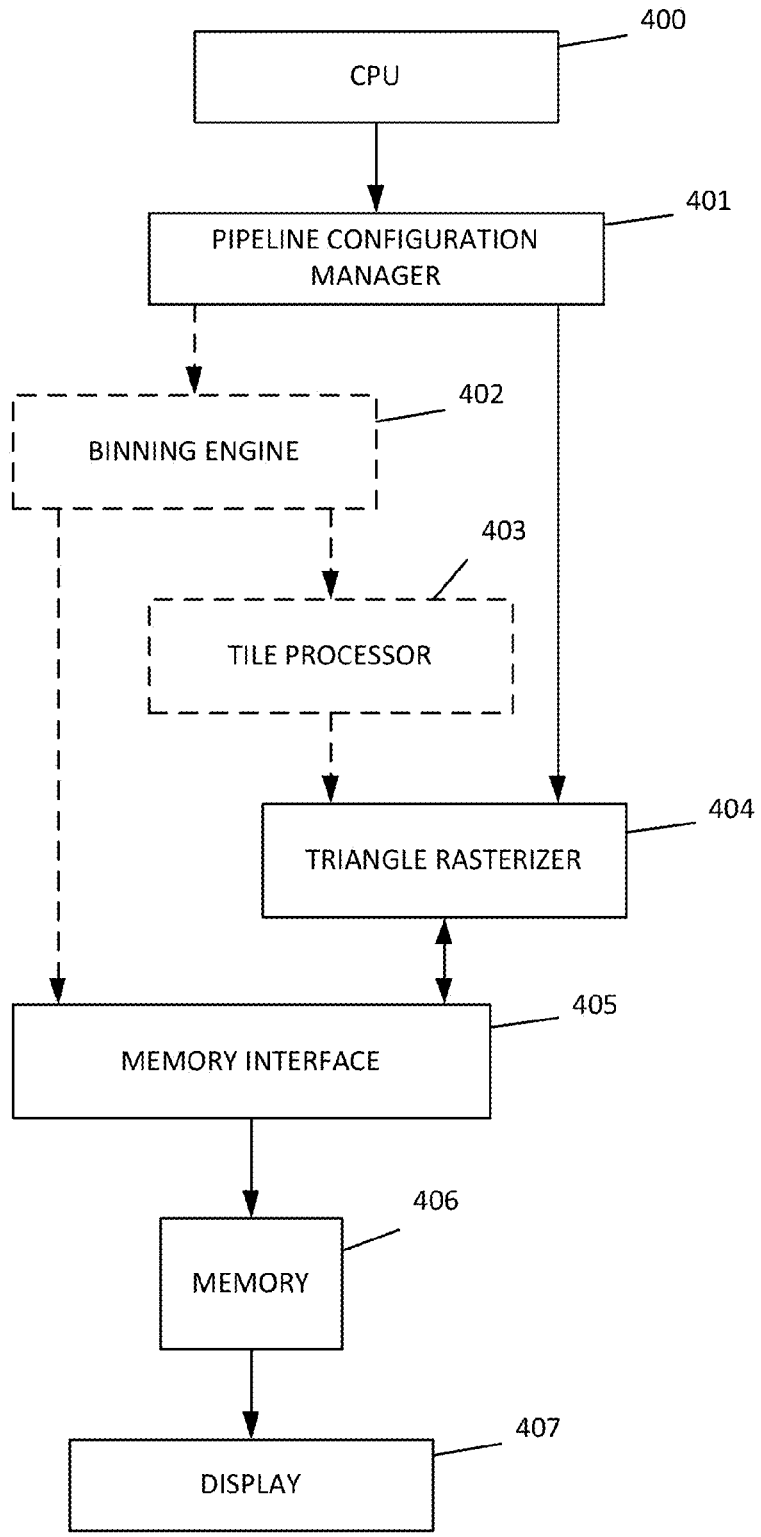
FIG. 4 is a diagram of a reconfigurable 3D graphics processing pipeline configured as a conventional 3D graphics processing pipeline in accordance with one or more embodiments.

Referring now to FIG. 4, a diagram of a reconfigurable 3D graphics processing pipeline configured as a conventional 3D graphics processing pipeline in accordance with one or more embodiments will be discussed. The CPU 400, memory interface 405, memory 406 and display 407 are as described with respect to FIG. 3 as CPU 300, memory interface 305, memory 306, and display 307. During configuration for conventional operation, the pipeline configuration manager 401 disables the binning engine 402 and tile processor 403 as indicated by the dashed lines in FIG. 4. In such a configuration, the triangle rasterizer 404 directly processes the graphics commands, rendering each graphical object in its entirety in the order in which the commands were submitted by the CPU 400.

Figure 5:
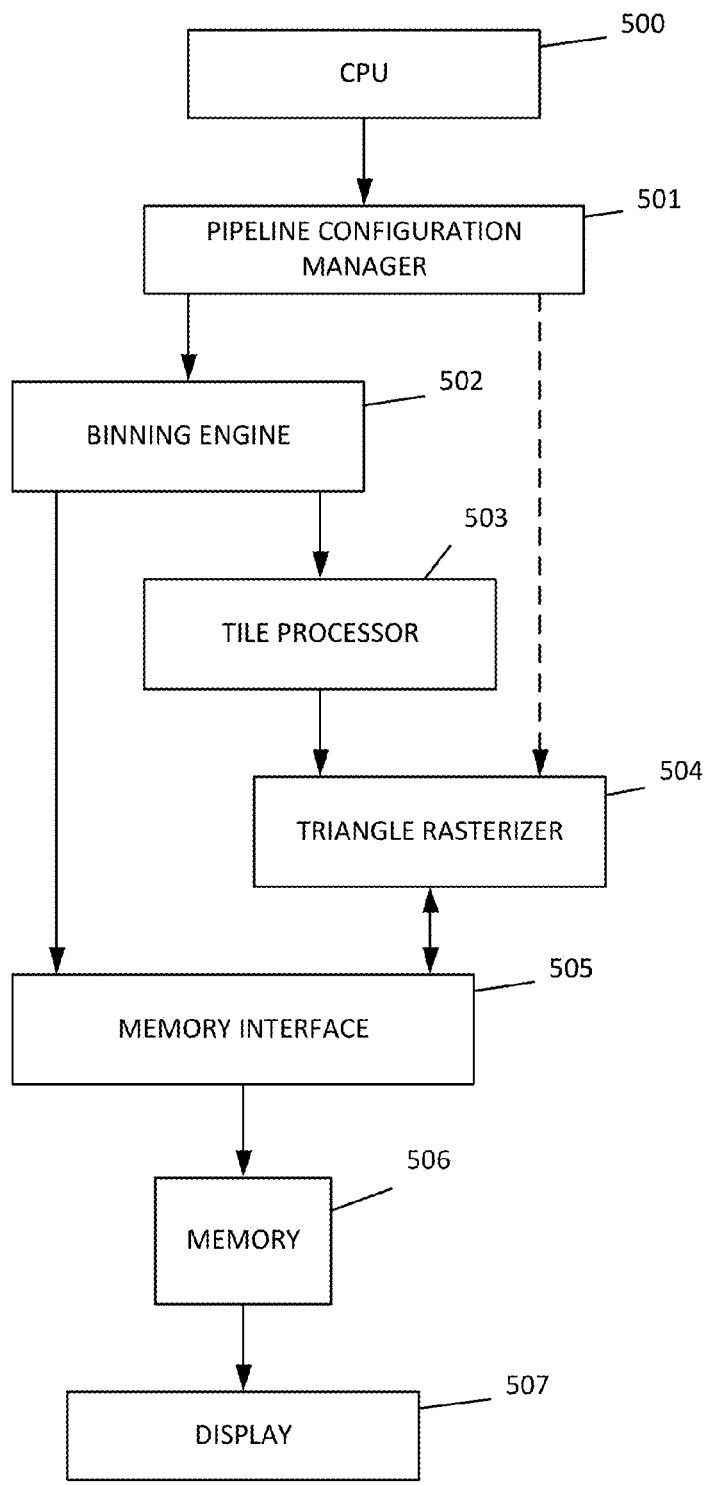
FIG. 5 is a diagram of a reconfigurable 3D graphics processing pipeline configured as a tiling-based 3D graphics processing pipeline in accordance with one or more embodiments.

Referring now to FIG. 5, a diagram of a reconfigurable 3D graphics processing pipeline configured as a tiling-based 3D graphics processing pipeline in accordance with one or more embodiments will be discussed. The CPU 500, memory interface 505, memory 506 and display 507 are as described with respect to FIG. 3 as CPU 300, memory interface 305, memory 306, and display 307. During configuration for tiling-based operation, the pipeline configuration manager 501 disables the direct data path to the triangle rasterizer 504 as indicated by the dashed lines in FIG. 5. In such a configuration, the triangle rasterizer 504 instead processes graphics commands received from the tile processor 503, rendering graphical objects from each tile as determined by the binning engine 502.

Figure 6:
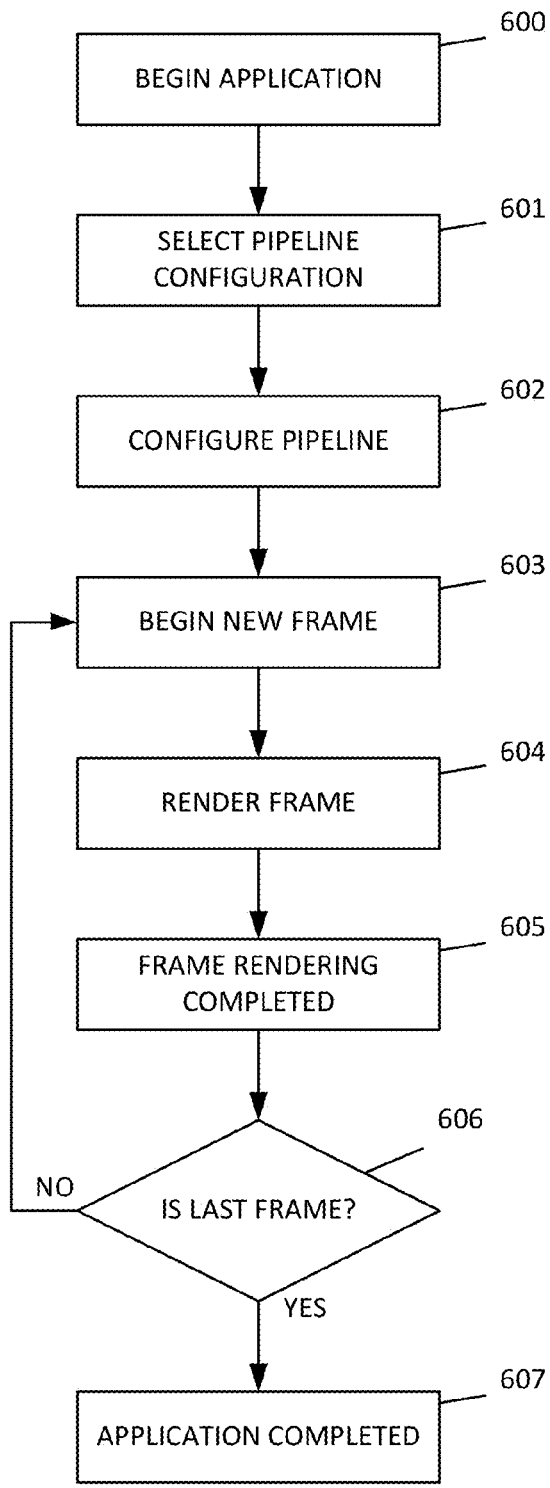
FIG. 6 is a flow diagram of an example reconfigurable 3D graphics processing pipeline application configuration process in accordance with one or more embodiments.

Referring now to FIG. 6, a flow diagram of an example reconfigurable 3D graphics processing pipeline application configuration process in accordance with one or more embodiments will be discussed. As shown in FIG. 6, the pipeline configuration may be controlled by an example application or device driver directly. When the application begins at block 600, prior to any rendering, a pipeline configuration may be selected at block 601. Such a determination may be made for whatever reason the application sees fit to employ, but typically may be the result of knowledge about the merits of the selected mode of operation with respect to the specific rendering tasks of the application. Subsequently, pipeline configuration commands may be issued by the application at block 602, effecting the desired configuration in the graphics processor. The application then begins processing at block 603 on each frame it desires to render. The frame is rendered at block 604, and the application determines if the frame is complete at block 605. If the application determines at decision block 606 that there are more frames to render, the application begins to process the next frame is then begun at block 603. If the last frame has been rendered as determined at decision block 606, the application may complete the processing operation at block 607. In this mode of operation, no dynamic or automatic configuration is performed by the example graphics processor wherein the configuration is left as specified by the application or device driver. In an alternate example embodiment, the application makes a determination of the desired mode of operation and optionally issues configuration commands once for each frame to be rendered. In other embodiments, configuration may be statically determined by the application once at startup, or statically by intermediate driver software based on black-lists or white-lists of known applications. These are examples of, but in no way limit, the manner in which an application can directly control the example reconfigurable 3D graphics processor, and the scope of the claimed subject matter is not limited in these respects.

Figure 7:
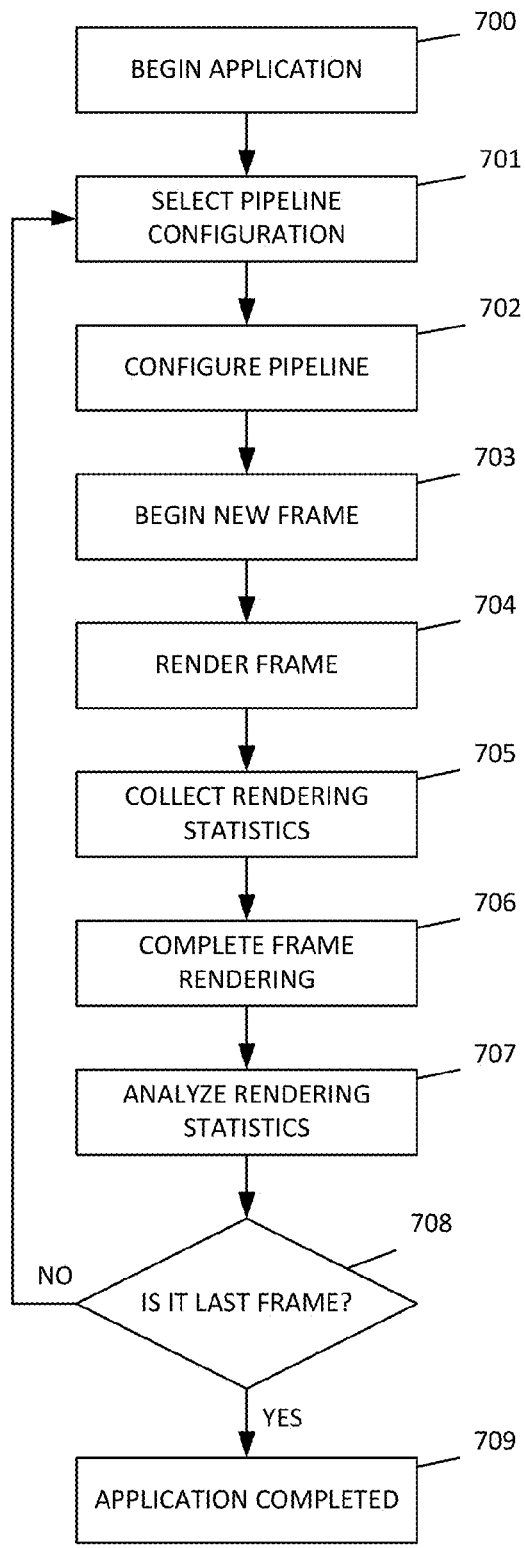
FIG. 7 is a flow diagram of an example reconfigurable 3D graphics processing pipeline implementing a dynamic configuration process in accordance with one or more embodiments.

Referring now to FIG. 7, a flow diagram of an example reconfigurable 3D graphics processing pipeline implementing a dynamic configuration process in accordance with one or more embodiments will be discussed. As shown FIG. 7, the graphics processor configuration may be controlled through a dynamic feedback process facilitated by the collection of per-frame rendering statistics. In this example the application is directly involved in the dynamic configuration process, but this in no way limits the potential embodiments or the scope of the claimed subject matter. Configuration determination may be also be performed by device driver software in a manner transparent to the application being executed, and/or the graphics processor may automatically reconfigure itself based on internal state and logic in yet further example embodiments. The application begins at block 700 by initializing rendering statistics to desired default values or otherwise indicating the desired initial configuration to the configuration selection process. At this point, frame processing begins, in this example starting with selection of a pipeline configuration at bock 701 after programmatic examination of rendering statistics collected by the graphics processor. Such statistics in this example may consist of two sets of power, elapsed processing time and memory bandwidth values. The two sets of values correspond to the two operating modes of the reconfigurable 3D graphics processor. The processor computes an estimate of the values for the mode not currently configured and directly measures the values from the selected mode. These values are stored at the end of each frame for use during the configuration selection process of the subsequent frame. The lowest cost operating mode may be estimated for the current frame based on the performance of one or more prior frames, where cost in this example may be a weighted average of power, time and memory bandwidth values. Other suitable statistics and/or calculations may be performed in other embodiments of a reconfigurable 3D graphics processor dependent on how many operational modes are embodied and what the appropriate selection criteria for said modes are.

Once the configuration has been selected at block 701, the commands to configure the pipeline are sent to the graphics processor at block 702. The frame rendering then begins at block 703, the frame is rendered at block 704, and the estimated and measured rendering statistics are collected at block 705. At this point, the frame may be completed at block 706, and the current statistics are analyzed in preparation for any subsequent frame at block 707. If the example application has further frames to render as determined at decision block 708, the application continues with the pipeline configuration selection block 701. Otherwise, the application completes at block 709.

Other example embodiments may involving choosing to employ various hysteresis functions or cost saving techniques, gathering statistics and making operational mode determinations only after a group of frames has been processed and amortizing any additional costs across the number of frames in a group. Other statistical sub-sampling techniques such as monitoring only certain regions or time-intervals of the frame being rendered may also be employed, and the scope of the claimed subject matter is not limited in this respect.

Figure 8:
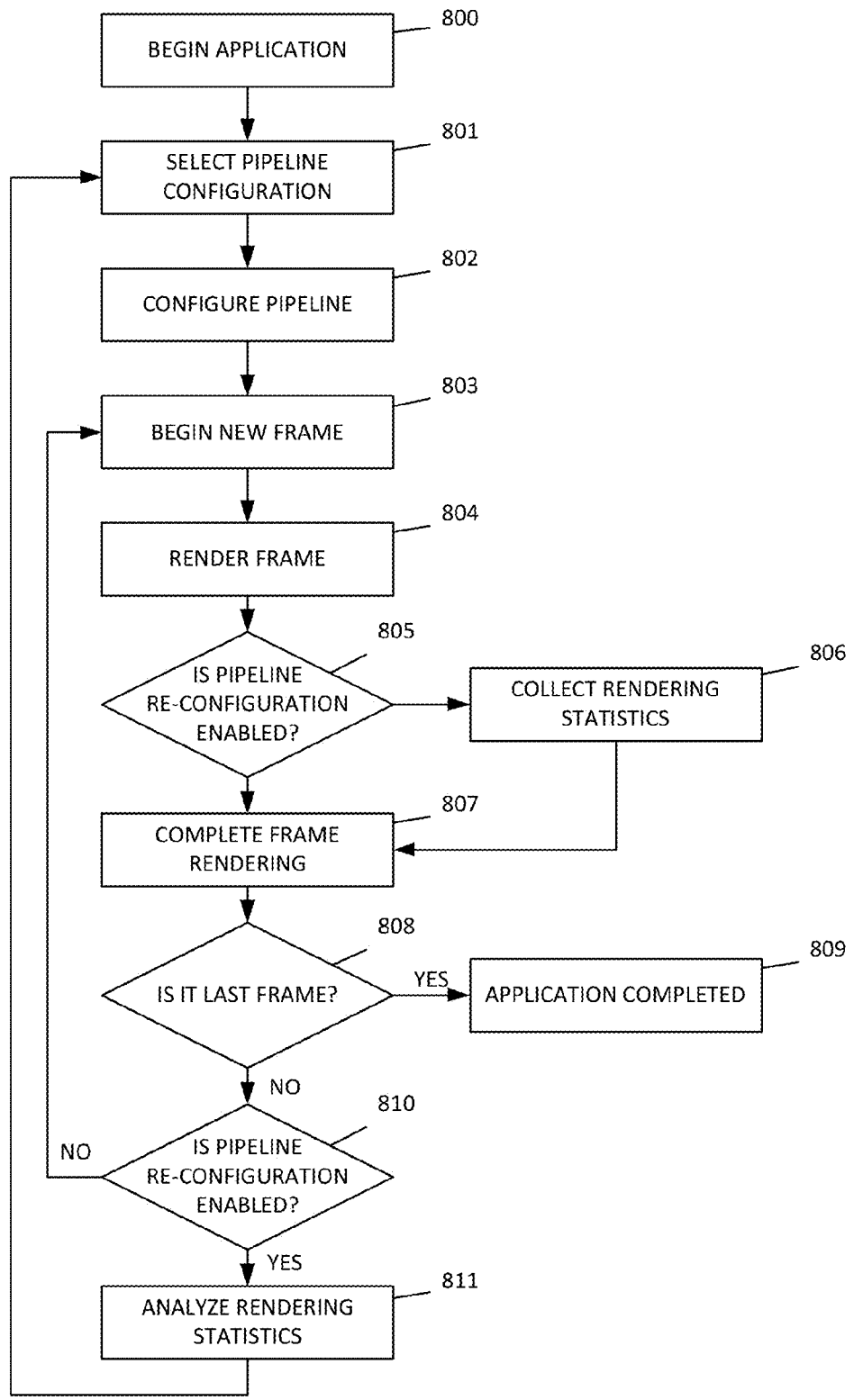
FIG. 8 is a detailed flow diagram of an example reconfigurable 3D graphics processing pipeline dynamic configuration process in accordance with one or more embodiments.

Referring now to FIG. 8, a detailed flow diagram of an example reconfigurable 3D graphics processing pipeline dynamic configuration process in accordance with one or more embodiments will be discussed. As shown in FIG. 8, the graphics processor configuration may be controlled through a combination of application specified and dynamic feedback processes facilitated by the collection of per-frame rendering statistics. In this example, the application may be directly involved in the dynamic configuration process. However, this in no way limits the potential embodiments or the scope of the claimed subject matter. Configuration determination may be also be performed by device driver software in a manner transparent to the application being executed, or the graphics processor may automatically reconfigure itself based on internal state and logic in yet further example embodiments. In yet other embodiments all three operational modes, application specified, device-driver controlled and automatically selected by hardware, may be available as configurable options. The application begins at block 800, initializing rendering statistics to desired default values or otherwise indicating the desired initial configuration to the configuration selection process. At this point, frame processing begins, in this example starting with selection of a pipeline configuration after programmatic examination of rendering statistics collected by the graphics processor at block 801. Such statistics in this example comprise two sets of power, elapsed processing time and memory bandwidth values. The two sets of values correspond to the two operating modes of the reconfigurable 3D graphics processor. The processor may compute an estimate of the values for the mode not currently configured and directly measures the values from the selected mode. These values are stored at the end of each frame for use during the configuration selection process of the subsequent frame. The lowest or nearly lowest cost operating mode may be estimated for the current frame based at least in part on the performance of one or more prior frames, where cost in this example may be a weighted average of power, time and memory bandwidth values. Other suitable statistics and calculations may be performed in other embodiments of a reconfigurable 3D graphics processor depending on how many operational modes are embodied and what the appropriate selection criteria for said modes are.

Once the configuration has been selected at block 801, the commands to configure the pipeline are sent to the graphics processor at block 802. The frame rendering then begins at block 803, and the frame is rendered at block 804. At this point, if the re-configurability of the pipeline is enabled as determined at decision block 805, for example via a mode setting or hint from the application, the rendering statistics and estimations for the current frame are collected at block 806, and the rendering of the frame is complete at block 807. If re-configurability is not enabled, operation continues with the completion of the frame at block 807.

If the example application has further frames to render as determined at decision block 808, the application continues with the conditional pipeline configuration selection check at decision block 810, otherwise the application completes at block 809. If further frames remain to be processed, pipeline re-configurability is checked at decision block 810, and if enabled, the collected statistics may be analyzed at block 811 before continuing with the pipeline configuration block 801. If not enabled, operation continues with the beginning of the next frame at block 803.

Other embodiments may involve choosing to employ various hysteresis functions or cost saving techniques, gathering statistics and making operational mode determinations only after a group of frames has been processed and amortizing any additional costs across the number of frames in a group. Other statistical sub-sampling techniques such as monitoring only certain regions or time-intervals of the frame being rendered may also be employed, and the scope of the claimed subject matter is not limited in this respect.

Figure 9:
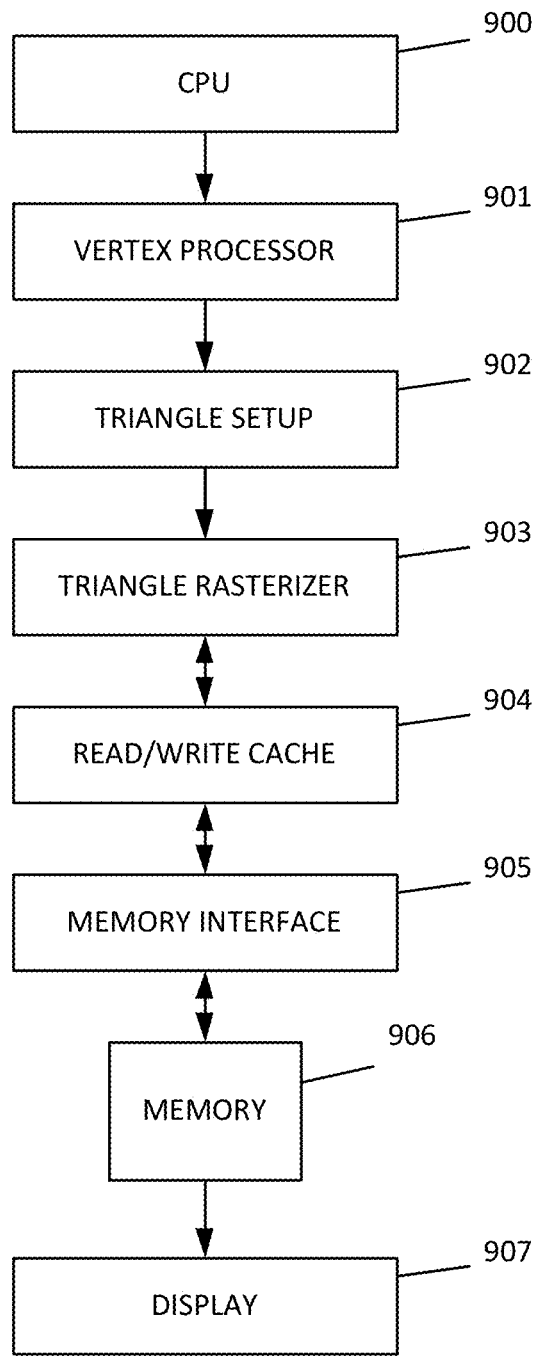
FIG. 9 is diagram of an example 3D graphics processing pipeline in accordance with one or more embodiments.

Referring now to FIG. 9, a diagram of an example 3D graphics processing pipeline in accordance with one or more embodiments will be discussed. The graphics pipeline as shown in FIG. 9 is an example conventional rasterizer that may be utilized in a reconfigurable 3D graphics processor. This example consists of a central processing unit (CPU) 900 running one or more applications which generate sequences of drawing commands. A sequence of drawing commands consists of descriptions of geometric shapes, typically triangles, points and lines, their vertex coordinates and other per-vertex attributes such as color or lighting information, and any mode settings used to control how the drawing commands are to be processed by the graphics processing unit (GPU). The drawing commands are processed by a vertex processor 901 which performs fetching of vertex data from memory and application of vertex processing via an application-specified shader program. Vertex processing in this case includes all geometry-related processing including any optional geometry or tessellation processing. Once sufficient vertex data is available to completely describe a triangle, the basic unit of rasterization in this example embodiment, the triangle setup unit 902 performs calculations such as edge equation setup, clipping and/or viewport transformation. Once setup is complete, a properly conditioned set of one or more triangles may be sent to the triangle rasterizer 903. The triangle rasterizer 903 processes said commands and determines which pixels are covered by each drawn object in the sequence each object was submitted to the rasterizer by the CPU 900. Each drawn object may be rendered in its entirety before subsequent objects are processed. For each pixel on the interior of each object, the memory interface 905 is utilized to send requests to memory 906 for reading and writing the pixels as well as fetching any ancillary information such as, for example, prior pixel values or texture image data. In this example embodiment, a read/write data cache 904 may be disposed between the rasterizer 903 and the memory interface 905 to reduce memory bandwidth requirements for pixels that share cache-lines of memory which typically happens at the edge of triangles being rendered. Once an image has been rendered, it is typically sent to a display interface 907, although rendered images may be used elsewhere in the computer application or system, and the scope of the claimed subject matter is not limited in this respect.

Figure 10:
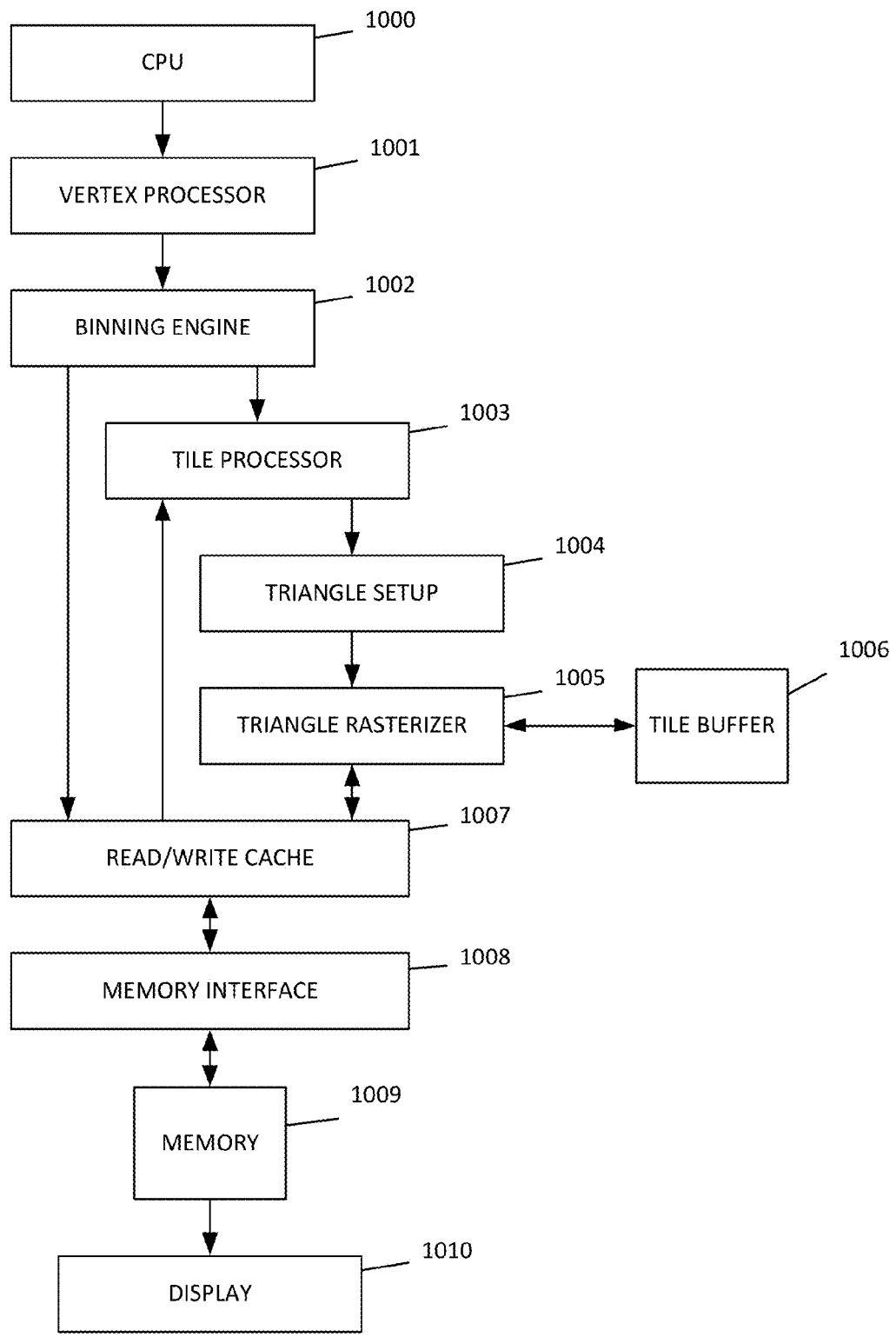
FIG. 10 is diagram of a tiling-based 3D graphics processing pipeline in accordance with one or more embodiments.

Referring now to FIG. 10, a diagram of a tiling-based 3D graphics processing pipeline in accordance with one or more embodiments will be discussed. FIG. 10 illustrates a block diagram of an example tiling-based rasterizer comprising a central processing unit (CPU) 1000 running one or more applications which generate sequences of drawing commands A sequence of drawing commands comprises descriptions of geometric shapes, typically triangles, points and lines, their vertex coordinates and other per-vertex attributes such as color or lighting information, and any mode settings used to control how the drawing commands are to be processed by the graphics processing unit (GPU). The drawing commands may be processed by a vertex processor 1001 that performs fetching of vertex data from memory and application of vertex processing via an application-specified shader program. Vertex processing in this case includes all geometry-related processing including any optional geometry or tessellation processing.

A binning engine 1002 determines which rectangular regions or tiles of the image being rendered are covered by each drawn object. An example tile organization might be a regular grid of tiles 16 by 16 pixels in size completely covering the image to be rendered. In other embodiments, any tiling, whether regular or following some other scheme for partitioning the frame to be rendered, also may be possible. For each tile covered by a given object, the binning engine 1002 utilizes the memory interface 1008 via a read/write cache 1007 to append the drawing commands for the object in a data structure associated with each tile stored in memory 1009. Once all drawing commands for the image to be rendered have been processed by binning engine 1002, the tile processor 1003 processes the command data structure associated with each tile in sequence, issuing commands which have been determined to affect the currently processed tile to the pixel rasterization portion of the pipeline.

Once sufficient vertex data is read from the tile command stream to completely describe a triangle, the basic unit of rasterization in this example embodiment, the triangle setup unit 1004 performs calculations such as edge equation setup, clipping and viewport transformation. Once setup is complete, a properly conditioned set of one or more triangles may be sent to the triangle rasterizer 1005. The triangle rasterizer 1005 processes the commands and determines which pixels are covered by each drawn object in the tile command stream. For each pixel on the interior of each object, the tile buffer 1006 is utilized as a direct-mapped frame-buffer cache for reading and writing the pixel values. The memory interface 1008 is utilized via a read/write cache 1007 to send requests to memory 1009 to load or store any initial frame-buffer values from their main memory addresses into the tile buffer 1006. The same pathway also may be utilized in this example embodiment to fetch any ancillary information such as, for example, other buffer values or texture image data. When processing the command stream of a given tile is completed and the tile buffer contains the final pixel values for the given tile of the image being rendered, the values are written back to their memory counterparts, and the tile processor 1003 selects the next tile in the sequence to be rendered. When all tiles have been processed and an image has been completely rendered, it is typically sent to a display interface 1010, although rendered images may be used elsewhere in the computer application or system, and the scope of the claimed subject matter is not limited in this respect.

Figure 11:
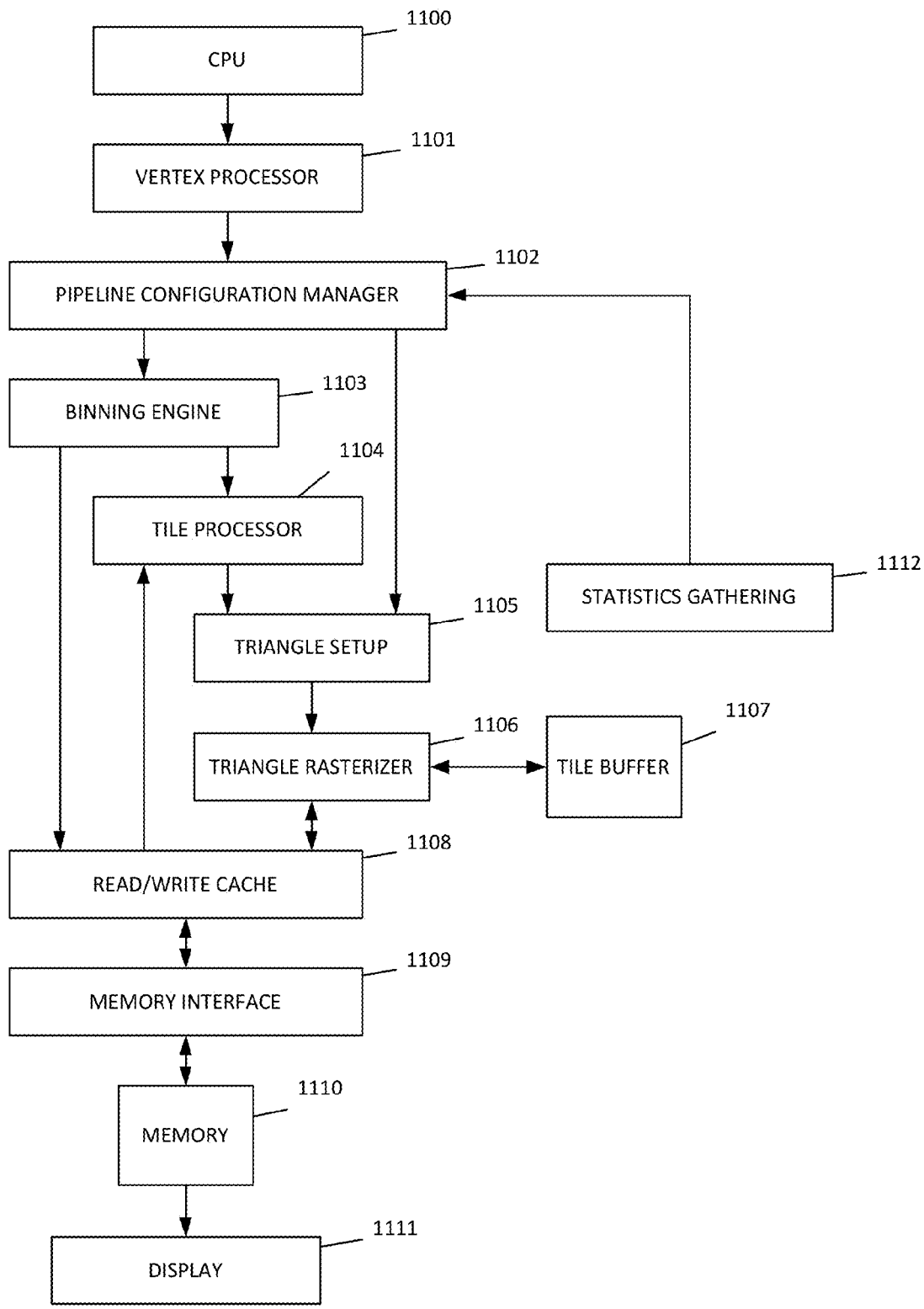
FIG. 11 is a diagram of a reconfigurable 3D graphics processing pipeline in accordance with one or more embodiments.

Referring now to FIG. 11, a diagram of a reconfigurable 3D graphics processing pipeline in accordance with one or more embodiments will be discussed. The example reconfigurable graphics processor of FIG. 11 combines aspects of both a conventional and a tiling-based rasterizer as shown in and described with respect to FIG. 9 and FIG. 10, respectively. Other embodiments may involve choosing between any other known practical rasterizer techniques. The reconfigurable graphics processor of FIG. 11 comprises a CPU 1100 running one or more applications which generate sequences of drawing commands. A sequence of drawing commands consists of descriptions of geometric shapes, typically triangles, points and lines; their vertex coordinates and other per-vertex attributes such as color or lighting information, and any mode settings used to control how the drawing commands are to be processed by the GPU. The drawing commands are processed by a vertex processor 1101 which performs fetching of vertex data from memory and application of vertex processing via an application-specified shader program. Vertex processing in this case may include all geometry-related processing including any optional geometry or tessellation processing.

A pipeline configuration manager 1102 selects which operating mode the remainder of the pipeline utilizes to complete the processing of the drawing commands. In this example embodiment, the two modes, tiling-based and conventional, are tracked with statistics 1112 collected during previous frames of rendering operations. The configuration manager 1102 switches operating modes at frame boundaries in this example embodiment. In other embodiments, different intervals may be utilized, such as making a selection once at the start of application processing, utilizing driver software to make selections, or grouping clusters of frames to amortize the cost of statistics gathering and analysis. Further embodiments of a reconfigurable 3D graphics rasterizer may enable or disable the collection of statistics and performing of configuration analysis under application or device driver control.

During a configuration change, the configuration manager controls the behavior of the remainder of the graphics pipeline by asserting control signals and issuing commands to the remaining functional units. In this example embodiment, the changes may include configuring the binning engine 1103, tile processor 1104 and tile buffer 1107 to be active or passive, configuring the statistics gathering hardware 1112 for the appropriate statistics to be gathered in each mode, and configuring the triangle setup 1105 to operate in tiled or whole-screen mode.

In tiling-based mode, the configuration manager 1102 sends commands from the vertex processor 1101 to the binning engine 1103. The operation of binning engine 1103, tile processor 1104, triangle setup 1105, triangle rasterizer 1106, tile buffer 1107, read/write cache 1108, memory interface 1109 and memory 1110 then corresponds to descriptions of binning engine 1002, tile processor 1003, triangle setup 1004, triangle rasterize 1005, tile buffer 1006, read/write cache 1007, memory interface 1008 and memory 1009, respectively, of FIG. 10. In addition to the operation of the corresponding functional blocks, the tiling-based mode collects statistics 1112 concerning the performance of the various tiling operations and performs an estimation of the corresponding cost statistics for the conventional rasterizer.

In a conventional mode, the configuration manager 1102 sends commands from the vertex processor 1101 to the triangle setup 1105 directly, bypassing the binning engine 1103 and tile processor 1104. The operation of triangle setup 1105, triangle rasterizer 1106, read/write cache 1108, memory interface 1109 and memory 1110 then corresponds to descriptions of triangle setup 902, triangle rasterizer 903, read/write cache 904, memory interface 905 and memory 906, respectively, of FIG. 9. In addition to the operation of the corresponding functional blocks, the conventional mode collects statistics 1112 concerning the performance of the various rasterizing operations and performs an estimation of the corresponding cost statistics for the tiling-based rasterizer.

In order to support the example operating modes, triangle setup 1105 and triangle rasterizer 1106 should support both tile-relative as well as full-screen rendering modes. In this case, this is accomplished with a clipping unit configured by the tile processor 1104 to render to only the currently processed tile in tile-based mode, or driven by the pipeline configuration manager 1102 to render to the whole buffer when in conventional mode.

Figure 12:
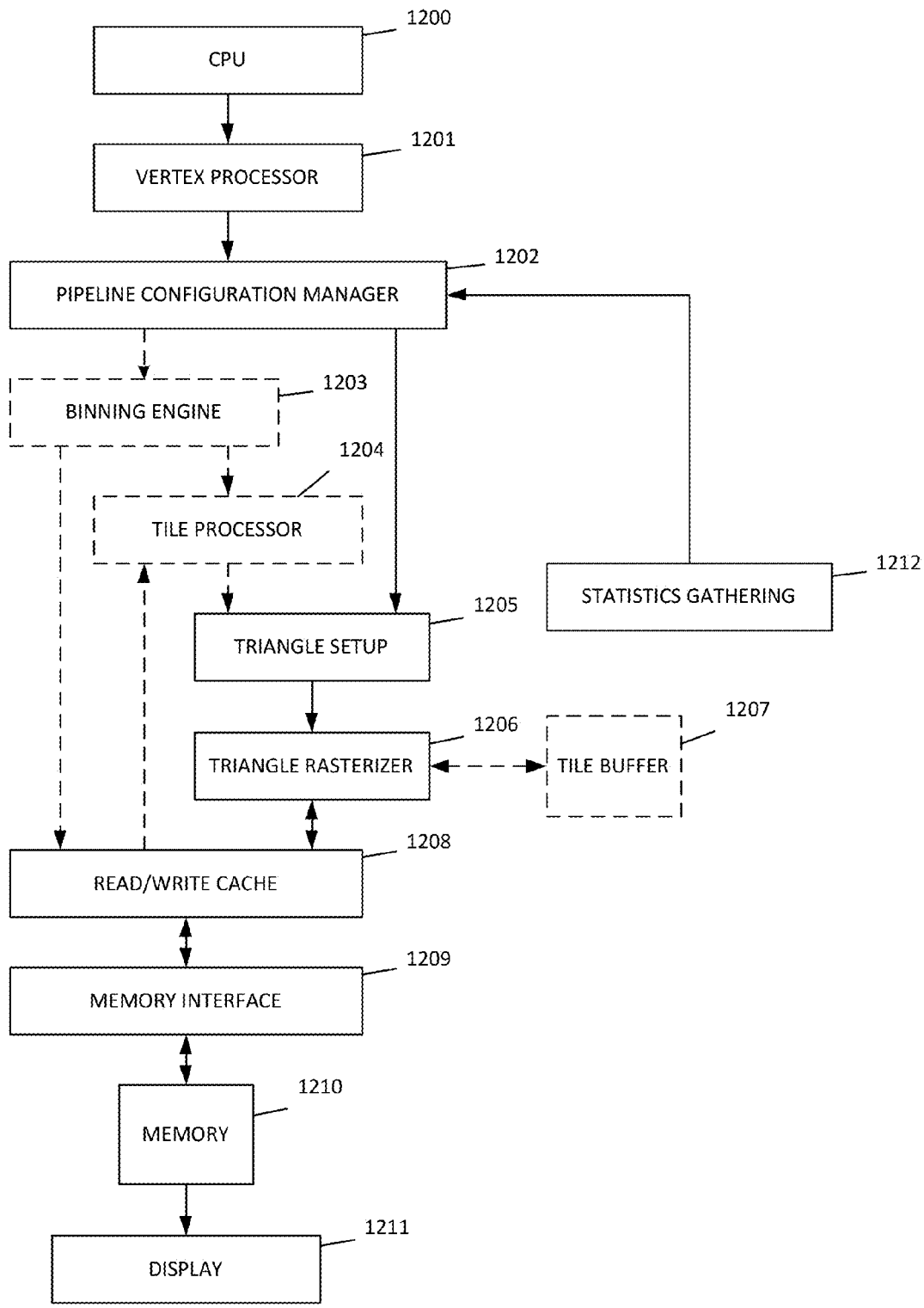
FIG. 12 is a diagram of a reconfigurable 3D graphics processing pipeline configured as a conventional 3D graphics processing pipeline in accordance with one or more embodiments.

Referring now to FIG. 12, a diagram of a reconfigurable 3D graphics processing pipeline configured as a conventional 3D graphics processing pipeline in accordance with one or more embodiments will be discussed. FIG. 12 shows the reconfigurable pipeline of FIG. 11 configured as a conventional rasterizer. The descriptions of elements 1200 through 1211 of FIG. 12 correspond to elements 1100 through 1111 of FIG. 11. During conventional operation, the pipeline configuration manager 1202 disables the binning engine 1203 and tile processor 1204 as indicated by the dashed lines in FIG. 12. The triangle rasterizer 1205 directly processes the graphics commands, rendering each graphical object in its entirety in the order in which the commands were submitted by the CPU 1200. The tile buffer 1207 is not involved in this mode of operation of the example embodiment since the associated memory resources in this example are reused by the read-write cache 1208.

Figure 13:
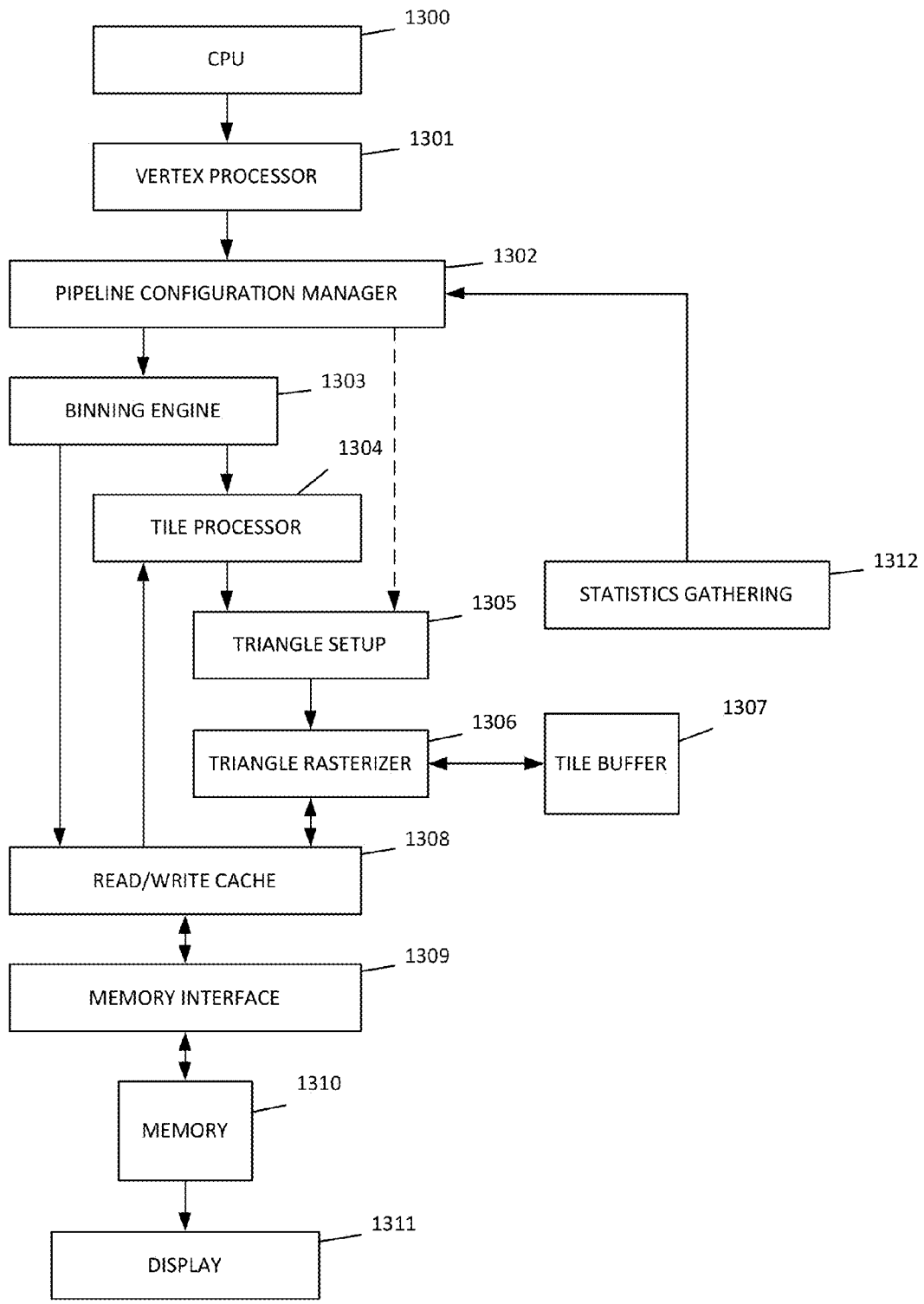
FIG. 13 is a diagram of a reconfigurable 3D graphics processing pipeline configured as a tiling-based 3D graphics processing pipeline in accordance with one or more embodiments.

Referring now to FIG. 13, a diagram of a reconfigurable 3D graphics processing pipeline configured as a tiling-based 3D graphics processing pipeline in accordance with one or more embodiments will be discussed. FIG. 13 depicts an example reconfigurable 3D graphics processor configured for tiling-based operation. The descriptions of elements 1300 through 1311 of FIG. 13 correspond to elements 1100 through 1111 of FIG. 11. During tiling-based operation, the pipeline configuration manager 1302 disables the direct data path to the triangle rasterizer 1205 as indicated by the dashed lines in FIG. 13. The triangle rasterizer 1306 instead processes graphics commands received from the tile processor 1304, rendering graphical objects from each tile as determined by the binning engine 1303.

Figure 14:
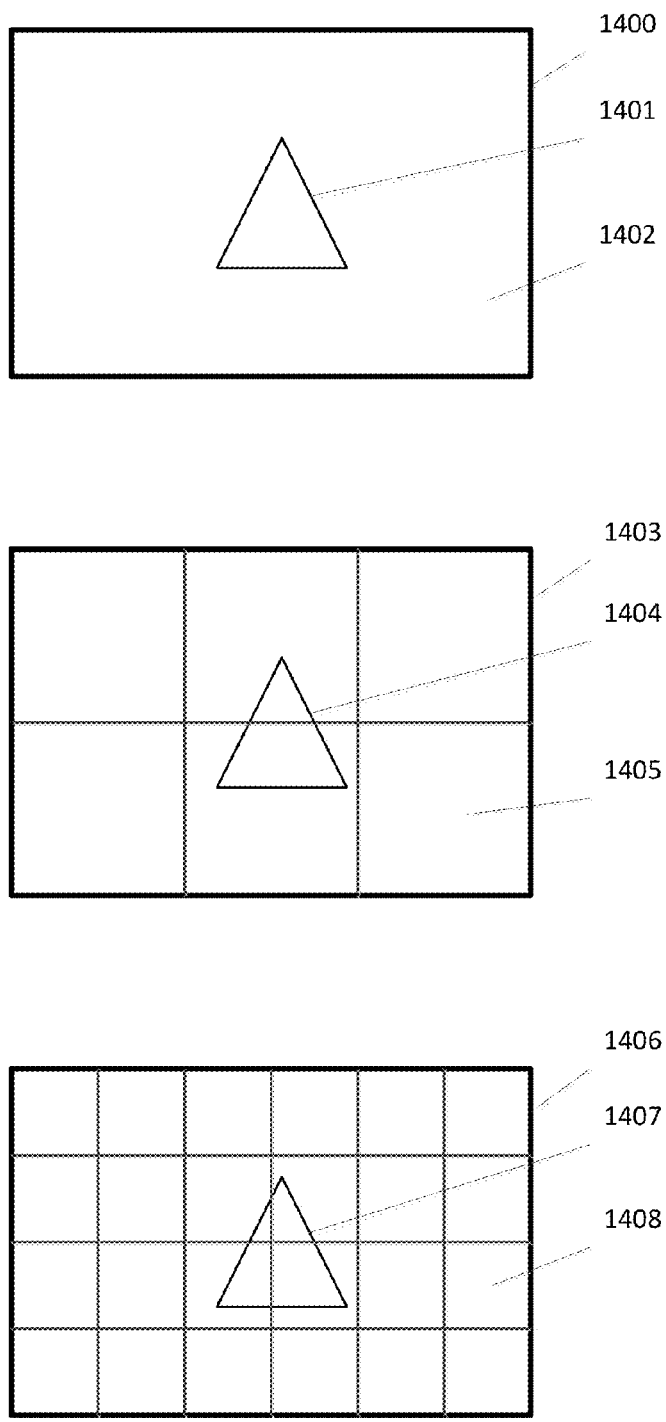
FIG. 14 is a diagram of a frame of 3D rendering tiled using different tiling sizes in accordance with one or more embodiments.

Referring now to FIG. 14, a diagram of a frame of 3D rendering tiled using different tiling sizes in accordance with one or more embodiments will be discussed. FIG. 14 depicts several example tilings of a frame to be rendered by a reconfigurable 3D graphics processor as described herein. Frame 1400, frame 1403 and frame 1406 represent the frame to be rendered, in this example containing the single triangles, triangle 1401, triangle 1404 and triangle 1407. Example 1402 depicts the clipping region and tile boundary when the example embodiment is configured to full-frame conventional mode. The tile boundary is identical to the extents of the frame to be rendered. In a conventional mode, the tile buffer may be disabled, and the rasterizer may communicate directly with the read-write cache when processing each pixel of each rendered primitive, in this example triangle 1401. In this case, the tile buffer used during tile-based operation may be repurposed as frame buffer cache memory for use by the rasterizer. Other embodiments may involve choosing to power down the tile memory or using it for other purposes. Still other embodiments may involve using a single stream of commands sent to the tile rasterizer through the same path as utilized during normal tile-based operation.

Example 1405 depicts one possible tiling with relatively larger tiles. This example configuration represents a case of tile-based rendering where the intermediate buffers involved for rendering have a small footprint in memory, allowing fewer large tiles to completely cover the frame to be rendered while providing sufficient on-chip buffering to contain all of the intermediate buffers for each tile to be rendered. In this example triangle 1404 overlaps two bins and thus only involves two command stream writes to be recorded into memory for later rendering during the tile-rasterization phase.

Example 1408 depicts another possible tiling with relatively smaller tiles. This example configuration represents a case of tile-based rendering where the intermediate buffers involved for rendering are larger relative to the example of frame 1403. In this example, each tile should be smaller so that the intermediate rendering buffers still fit into the on-chip memory buffering. In this example, triangle 1407 overlaps four bins and thus involves four command stream writes to be recorded into memory for later rendering during the tile-rasterization phase. In effect, this mode is twice as expensive to bin as the configuration shown in 1403.

In order to correctly handle tiling-based rendering configurations, some form of relative addressing may be utilized to map pixels in the frame buffer to pixels in the tile-buffer. The tile buffer represents a fixed rectangular region addressed from 0, 0 to whatever width and height the tile engines are configured for. Tiles themselves are mapped onto the frame buffer starting at some 0, 0 index and spanning the set of tiles needed to cover the width and height of the frame buffer. The tiling-based pixel processor should reconstruct the correct address of each frame buffer tile stored in the tile buffer in order to load and store pixel and other buffer values correctly.

One example reconfigurable 3D graphics processor utilizes a base address of the frame buffer along with the width of a row of tiles and the address stride between tiles to compute an address for the first pixel row of each tile; then uses the address stride between pixel rows to compute the address for each row of pixels in the tile. Another example reconfigurable 3D graphics processor would limit tile size selections to powers of two to simplify offset and addressing calculations. Other examples may involve utilizing any general method, for example numerical division, table lookup, and/or any other method of arriving at tile addresses and tile offsets, without substantially altering the reconfigurable 3D graphics processing pipeline, and the scope of the claimed subject matter is not limited in these respects.

Figure 15:
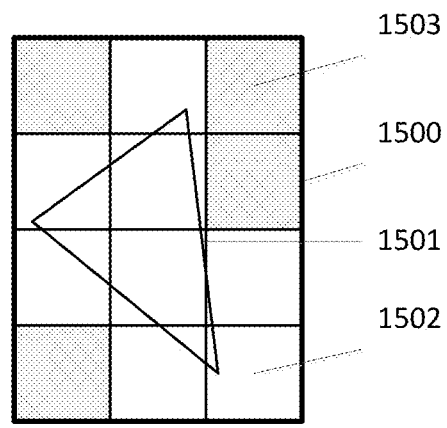
FIG. 15 is a diagram of triangle binning footprint estimation examples in accordance with one or more embodiments.
Figure 15:
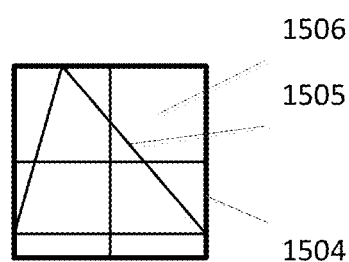
Figure 15:
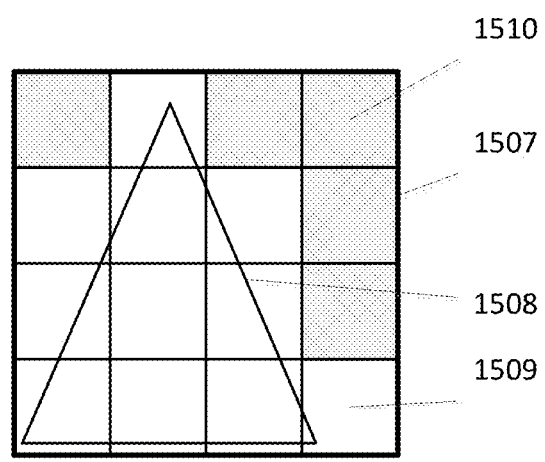

Referring now to FIG. 15, a diagram of triangle binning footprint estimation examples in accordance with one or more embodiments will be discussed. The decision to select one of the potential operating modes for a reconfigurable 3D graphics pipeline may be made based at least in part on some measurement of both the actual performance of prior frames as well as good estimations of the performance of prior frames when one or more alternate operating modes had been selected.

Typical measurements of the currently selected mode may include the actual work performed during the operation of a given mode by measuring transactions to external memory and the percentage of time each operational unit was functioning during a frame. In a conventional mode, these measured statistics may include all or nearly all frame pixel and texture accesses. In tiling-based mode, these measured statistics may include initial and final pixel read and write traffic as well as costs associated with writing and reading the binning command buffers. Estimating the cost of alternate, non-selected, modes potentially may be more difficult.

In a conventional mode, the number of tiles covered, even partially, by each triangle may serve as a good example estimator for the potential binning costs each triangle might incur. FIG. 15 depicts three example triangles and their corresponding tile footprints for which cost estimations of a tiling-based mode of operation are desired. In frame 1500 an example triangle is shown which covers 8 of 12 tiles in a tile-aligned bounding box. Shaded tiles 1503 represent the four tiles not touched by triangle 1501, and unshaded tiles 1502 represent tiles for which extra work would otherwise have to be performed in tiling-based mode during binning operations. Frame 1504 is an example with a triangle 1505 that touches all four tiles 1506 in the tile-aligned bounding box. Frame 1507 shows yet another triangle 1508 covering 11 tiles 1509 and leaving 5 tiles 1510 uncovered in the tile-aligned bounding box. In some but not necessarily all embodiments, finding the exact number of tiles touched may be both prohibitively expensive as well as overly precise for the purpose of selecting an operational mode.

Estimating the area of the triangle in tile units can be accomplished in an example reconfigurable 3D graphics pipeline by comparing the tile-aligned bounding-box area of a given triangle with the area of the triangle as calculated with a cross-product of two edge vectors of the triangle. At one extreme, a triangle should minimally cover as many tiles as there are tile's worth of pixels in the interior of the triangle. At the other extreme, a triangle may cover no more than the tiles in the tile-aligned bounding box of the triangle vertexes. An example reconfigurable 3D graphics processor may utilize a weighted average of the two area measurements to arrive at an estimation of the tiles actually covered. In one embodiment, the precision of integral math operations may be reduced from pixel to tile addressing space before the triangle area computations are performed. In an alternate embodiment, a simple tile-corner rasterization phase can be used to get a more accurate measure of binning-related costs, potentially using the binning engine to perform this estimation.

In a tiling-based mode, the additional costs of conventional rendering may be related directly to the number of pixels or other buffer data which are accessed during each tiles' pixel processing phase. An example reconfigurable 3D graphics processor may disregard or weight the cost of pixel accesses to the tile buffer as well as tracking memory accesses for buffer load and store operations. The actual cost of the binned tile command stream may be directly measured and treated as an extra tiling-based mode cost which the conventional rasterization mode omits. In one embodiment of a reconfigurable 3D graphics processor, the estimation of the performance of conventional rendering may be augmented with a cache performance estimator in order to more closely estimate real-world performance.

An alternate embodiment may involve choosing to measure total triangle counts and making a determination about the operational mode based on a threshold value. This might be sufficient in cases where usage patterns fall into low-complexity geometry cases, such as graphical user interface (GUI) compositing, suitable for tiling-based rendering and high-complexity geometry cases such as game applications which are better suited for conventional rasterization. In this example, if the triangle count exceeds the threshold, the conventional mode is selected, otherwise the tiling-based mode is chosen. Other embodiments may involve choosing any measurements and estimators which correlate with the observed performance of each mode, and these examples in no way limit the scope of the claimed subject matter.

Figure 16:
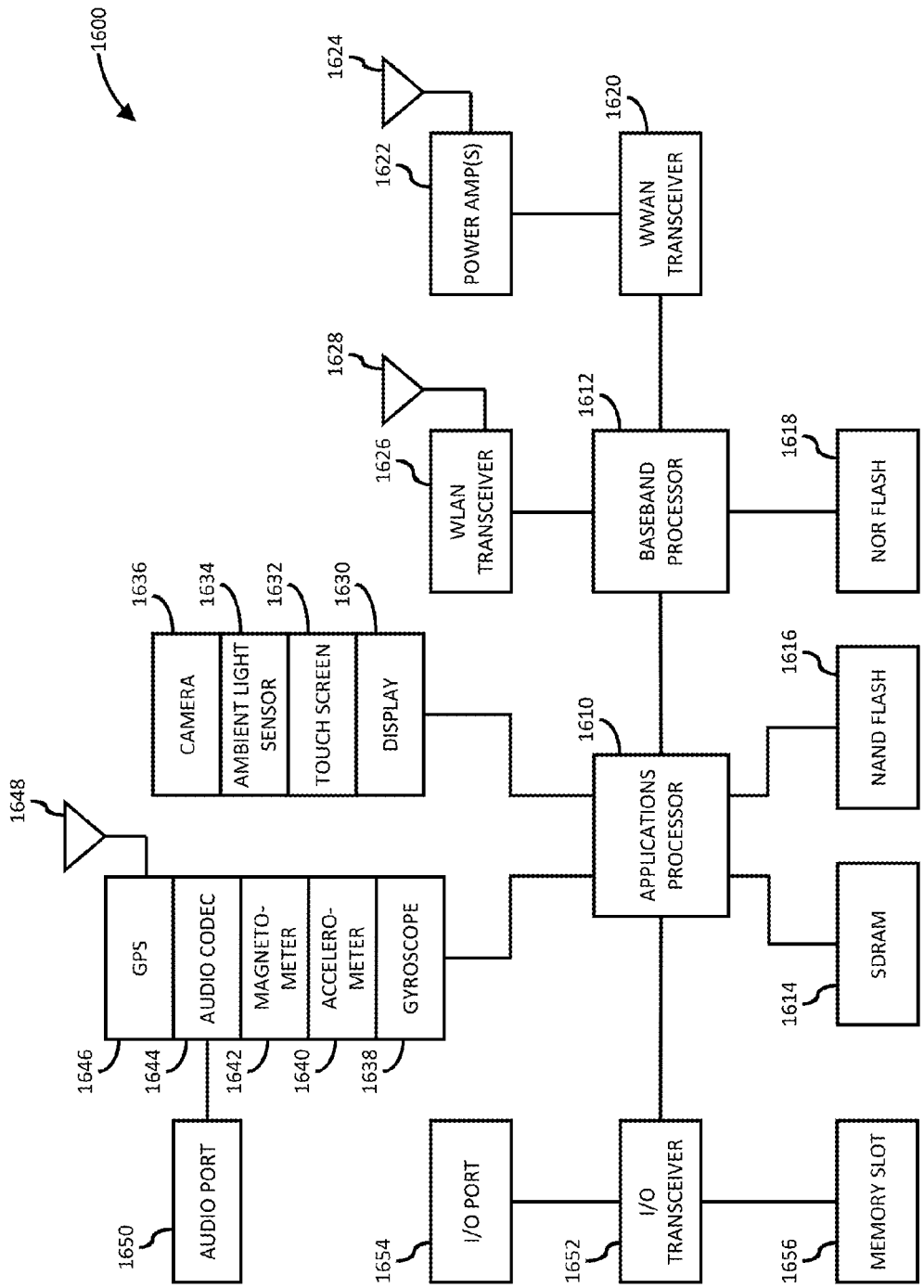
FIG. 16 is a block diagram of an information handling system capable of utilizing a reconfigurable 3D graphics processor in accordance with one or more embodiments.

Referring now to FIG. 16, a block diagram of an information handling system capable of utilizing a reconfigurable 3D graphics processor in accordance with one or more embodiments will be discussed. Information handling system 1600 of FIG. 16 may tangibly embody one or more of any of the embodiments described herein, either in hardware and/or in software running on information handling system 1600. Although information handling system 1600 represents one example of several types of computing platforms, such as a smartphone, tablet, hand held gaming device, or the like, information handling system 1600 may include more or fewer elements and/or different arrangements of elements than shown in FIG. 16, and the scope of the claimed subject matter is not limited in these respects.

In one or more embodiments, information handling system 1600 may include an applications processor 1610 and a baseband processor 1612. Applications processor 1610 may be utilized as a general purpose processor to run applications and the various subsystems for information handling system 1600. Applications processor 1610 may include a single core or alternatively may include multiple processing cores wherein one or more of the cores may comprise a digital signal processor or digital signal processing core. Furthermore, applications processor 1610 may include a reconfigurable 3D graphics processor as described herein and/or coprocessor disposed on the same chip, or alternatively a reconfigurable 3D graphics processor as described herein coupled to applications processor 1610 may comprise a separate, discrete graphics chip. Applications processor 1610 may include on board memory such as cache memory, and further may be coupled to external memory devices such as synchronous dynamic random access memory (SDRAM) 1614 for storing and/or executing applications during operation, and NAND flash 1616 for storing applications and/or data even when information handling system 1600 is powered off. Baseband processor 1612 may control the broadband radio functions for information handling system 1600. Baseband processor 1612 may store code for controlling such broadband radio functions in a NOR flash 1618. Baseband processor 1612 controls a wireless wide area network (WWAN) transceiver 1620 which is used for modulating and/or demodulating broadband network signals, for example for communicating via a Third Generation (3G) or Fourth Generation (4G) network or the like or beyond, for example a Long Term Evolution (LTE) network. The WWAN transceiver 1620 couples to one or more power amps 1622 respectively coupled to one or more antennas 1624 for sending and receiving radio-frequency signals via the WWAN broadband network. The baseband processor 1612 also may control a wireless local area network (WLAN) transceiver 1626 coupled to one or more suitable antennas 1628 and which may be capable of communicating via a Wi-Fi, Bluetooth, and/or an amplitude modulation (AM) or frequency modulation (FM) radio standard including an IEEE 802.11a/b/g/n standard or the like. It should be noted that these are merely example implementations for applications processor 1610 and baseband processor 1612, and the scope of the claimed subject matter is not limited in these respects. For example, any one or more of SDRAM 1714, NAND flash 1616 and/or NOR flash 1618 may comprise other types of memory technology such as magnetic memory, chalcogenide memory, phase change memory, or ovonic memory, and the scope of the claimed subject matter is not limited in this respect.

In one or more embodiments, applications processor 1610 may drive a display 1630 for displaying various information or data, and may further receive touch input from a user via a touch screen 1632 for example via a finger or a stylus. An ambient light sensor 1634 may be utilized to detect an amount of ambient light in which information handling system 1600 is operating, for example to control a brightness or contrast value for display 1630 as a function of the intensity of ambient light detected by ambient light sensor 1634. One or more cameras 1636 may be utilized to capture images that are processed by applications processor 1610 and/or at least temporarily stored in NAND flash 1616. Furthermore, applications processor may couple to a gyroscope 1638, accelerometer 1640, magnetometer 1642, audio coder/decoder (CODEC) 1644, and/or global positioning system (GPS) controller 1646 coupled to an appropriate GPS antenna 1648, for detection of various environmental properties including location, movement, and/or orientation of information handling system 1700. Alternatively, controller 1646 may comprise a Global Navigation Satellite System (GNSS) controller. Audio CODEC 1644 may be coupled to one or more audio ports 1750 to provide microphone input and speaker outputs either via internal devices and/or via external devices coupled to information handling system via the audio ports 1650, for example via a headphone and microphone jack. In addition, applications processor 1610 may couple to one or more input/output (I/O) transceivers 1652 to couple to one or more I/O ports 1654 such as a universal serial bus (USB) port, a high-definition multimedia interface (HDMI) port, a serial port, and so on. Furthermore, one or more of the I/O transceivers 1652 may couple to one or more memory slots 1656 for optional removable memory such as secure digital (SD) card or a subscriber identity module (SIM) card, although the scope of the claimed subject matter is not limited in these respects.

Figure 17:
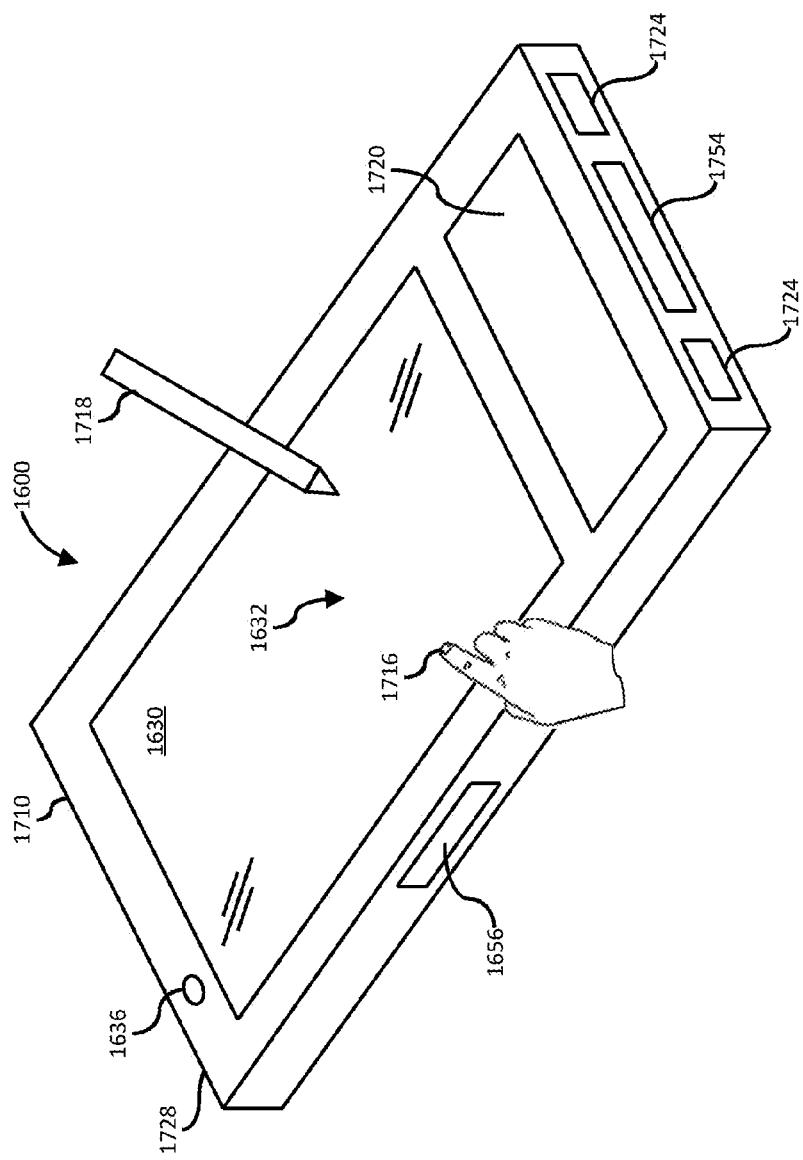
FIG. 17 is an isometric view of an information handling system of FIG. 16 that optionally may include a touch screen in accordance with one or more embodiments.

FIG. 17 is an isometric view of an information handling system of FIG. 16 that optionally may include a touch screen in accordance with one or more embodiments. FIG. 17 shows an example implementation of information handling system 1600 of FIG. 16 tangibly embodied as a cellular telephone, smartphone, or tablet type device or the like. The information handling system 1600 may comprise a housing 1710 having a display 1630 which may include a touch screen 1632 for receiving tactile input control and commands via a finger 1716 of a user and/or a via stylus 1718 to control one or more applications processors 1610. The housing 1610 may house one or more components of information handling system 1600, for example one or more applications processors 1610, one or more of SDRAM 1614, NAND flash 1616, NOR flash 1618, baseband processor 1612, and/or WWAN transceiver 1620. The information handling system 1600 further may optionally include a physical actuator area 1720 which may comprise a keyboard or buttons for controlling information handling system via one or more buttons or switches. The information handling system 1600 may also include a memory port or slot 1656 for receiving non-volatile memory such as flash memory, for example in the form of a secure digital (SD) card or a subscriber identity module (SIM) card. Optionally, the information handling system 1600 may further include one or more speakers and/or microphones 1724 and a connection port 1654 for connecting the information handling system 1600 to another electronic device, dock, display, battery charger, and so on. In addition, information handling system 1600 may include a headphone or speaker jack 1728 and one or more cameras 1636 on one or more sides of the housing 1710. It should be noted that the information handling system 1600 of FIG. 17 may include more or fewer elements than shown, in various arrangements, and the scope of the claimed subject matter is not limited in this respect.

Although the claimed subject matter has been described with a certain degree of particularity, it should be recognized that elements thereof may be altered by persons skilled in the art without departing from the spirit and/or scope of claimed subject matter. It is believed that the subject matter pertaining to reconfigurable 3D graphics processor and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A graphics processor, comprising:
    a pipeline configuration manager;
    a rasterizer coupled to the pipeline configuration manager; and a memory coupled to the rasterizer;

wherein the pipeline configuration manager is capable of configuring the graphics processor to operate in a direct rasterizing mode or a tiling mode to process a sequence of drawing commands received from a processing unit; and wherein the pipeline configuration manager is capable of selecting one of the direct rasterizing mode or the tiling mode prior to rendering a frame.

2. A graphics processor as claimed in claim 1, wherein the pipeline configuration manager routes the sequence of drawing commands to the rasterizer in the direct rasterizing mode.

3. A graphics processor as claimed in claim 1, further comprising a binning engine and a tile processor coupled to the binning engine, wherein the pipeline configuration manager routes the sequence of drawing commands to the rasterizer via the binning engine and the tile processor in the tiling mode.

4. A graphics processor as claimed in claim 3, wherein the binning engine is coupled to the memory in the tiling mode.

5. A graphics processor as claimed in claim 1, wherein the pipeline configuration manager selects the mode of operation based at least in part on rendering statistics from one or more prior rendered frames in the sequence of drawing commands.

6. A graphics processor as claimed in claim 1, wherein the rasterizer comprises a triangle rasterizer.

7. A graphics processor as claimed in claim 1, wherein the pipeline configuration manager comprises a vertex processor to process geometric data of the sequence of drawing commands.

8. A graphics processor as claimed in claim 1, further comprising a tile buffer coupled to the rasterizer to store frame buffer values during operation in the tiling mode.

9. An article of manufacture comprising a storage medium having instructions stored thereon that, if executed, result in:
   receiving a sequence of drawing commands from a processing unit;
   selecting a mode of operation of either a direct rasterizing mode using a rasterizer, or a tiling mode using a binning engine and a tile processor, wherein the mode of operation is selected prior to rendering a frame;
   processing the sequence of drawing commands by routing the sequence of drawing commands to the rasterizer in the direct rasterizing mode if the direct rasterizing mode is selected; and
   processing the sequence of drawing commands with the binning engine and the tile processor in the tiling mode if the tiling mode is selected.

10. An article of manufacture as claimed in claim 9, wherein the instructions if executed, further result in coupling the binning engine to a memory in the tiling mode.

11. An article of manufacture as claimed in claim 9, wherein the mode of operation is selected based at least in part on rendering statistics from one or more prior rendered frames in the sequence of drawing commands.

12. An article of manufacture as claimed in claim 9, wherein the rasterizer comprises a triangle rasterizer.

13. An article of manufacture as claimed in claim 9, wherein the instructions, if executed, further result in vertex processing geometric data of the sequence of drawing commands.

14. An article of manufacture as claimed in claim 9, wherein the instructions, if executed, further result in buffering frame buffer values during operation in the tiling mode.

15. An information handling system, comprising:
   a display; and
   a graphics processor coupled to the display, wherein the graphics processor comprises:
      a pipeline configuration manager;
      a rasterizer coupled to the pipeline configuration manager; and
      a memory coupled to the rasterizer;
      wherein the pipeline configuration manager is capable of configuring the graphics processor to operate in a direct rasterizing mode or a tiling mode to process a sequence of drawing commands received from a processing unit; and
      wherein the pipeline configuration manager is capable of selecting one of the direct rasterizing mode or the tiling mode prior to rendering a frame.

16. An information handling system as claimed in claim 15, wherein the pipeline configuration manager routes the sequence of drawing commands to the rasterizer in the direct rasterizing mode.

17. An information handling system as claimed in claim 15, further comprising a binning engine and a tile processor coupled to the binning engine, wherein the pipeline configuration manager routes the sequence of drawing commands to the rasterizer via the binning engine and the tile processor in the tiling mode.

18. A graphics processor as claimed in claim 17, wherein the binning engine is coupled to the memory in the tiling mode.

19. A graphics processor as claimed in claim 15, wherein the pipeline configuration manager selects the mode of operation based at least in part on rendering statistics from one or more prior rendered frames in the sequence of drawing commands.

20. An information handling system as claimed in claim 15, further comprising a touch screen coupled to the display to receive touch commands processed by the graphics processor.

* * * * *